(12) United States Patent
Bean et al.

(10) Patent No.: US 8,462,244 B2
(45) Date of Patent: Jun. 11, 2013

(54) ADAPTIVELY READING ONE OR MORE BUT FEWER THAN ALL PIXELS OF IMAGE SENSOR

(75) Inventors: Heather N Bean, Fort Collins, CO (US); Mark N Robins, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2217 days.

(21) Appl. No.: 10/648,445

(22) Filed: Aug. 27, 2003

(65) Prior Publication Data

US 2005/0046723 A1    Mar. 3, 2005

(51) Int. Cl.
*H04N 3/14* (2006.01)
*H04N 5/335* (2011.01)

(52) U.S. Cl.
USPC ........... 348/304; 348/314; 348/294; 348/298; 348/299; 348/311; 348/241; 348/248; 348/250; 348/208.1; 382/225

(58) Field of Classification Search
USPC ................ 348/314, 294, 298, 299, 311, 315, 348/241, 248, 250, 208.1, 289, 296; 382/225
See application file for complete search history.

(56) References Cited

U.S. PATENT DOCUMENTS

| 5,668,597 | A * | 9/1997 | Parulski et al. ............... 348/350 |
|---|---|---|---|
| 6,204,858 | B1 * | 3/2001 | Gupta ........................... 345/600 |
| 6,272,250 | B1 * | 8/2001 | Sun et al. ...................... 382/225 |
| 6,480,624 | B1 * | 11/2002 | Horie et al. ................... 382/165 |
| 6,549,644 | B1 | 4/2003 | Yamamoto |
| 6,631,208 | B1 * | 10/2003 | Kinjo et al. .................... 382/167 |
| 6,697,537 | B2 | 2/2004 | Norimatsu |
| 6,701,010 | B1 * | 3/2004 | Katsuyama ................... 382/165 |
| 6,930,716 | B2 | 8/2005 | Yoshida |
| 7,024,035 | B1 * | 4/2006 | Enomoto ....................... 382/167 |
| 2001/0050715 | A1 | 12/2001 | Sanpei |
| 2002/0164085 | A1 | 11/2002 | Norimatsu |
| 2003/0086134 | A1 * | 5/2003 | Enomoto ....................... 358/538 |
| 2003/0193593 | A1 * | 10/2003 | Lee et al. ...................... 348/302 |
| 2004/0036778 | A1 * | 2/2004 | Vernier ....................... 348/222.1 |

FOREIGN PATENT DOCUMENTS

JP        04313949 A    * 11/1992

OTHER PUBLICATIONS

"Charge-Coupled Device (CCD) Image Sensors", Rev. No. 1, May 29, 2001 http://www.kodak.com/global/plugins/acrobat/en/digital/ccd/applicationNotes/chargeCoupledDevice.pdf, pp. 11 and 13.
"Application Note, Solid State Image Sensors, Terminology", Dec. 8, 1994 http://www.kodak.com/global/plugins/acrobat/en/digital/ccd/applicationNotes/terminology.pdf, p. 28.
Excepts from "Anatomy of a Digital Camera: Image Sensors", Sally Wiener Grotta, Jun. 12, 2001, sections "NASA's APS" and "Sensor Packaging".

* cited by examiner

*Primary Examiner* — Usman Khan

(57) ABSTRACT

A method, of selectively reading less than all information from an image sensor for which member-pixels of a subset of the entire set of pixels are individually addressable, may include: sampling information from a targeted member-pixel of the subset without having to read information from the entire set of pixels; and adaptively reading information from another one or more but fewer than all member pixels of the entire set based upon the sampling information without having to read all pixels on the image sensor. A related digital camera may include features similar to elements of the method.

28 Claims, 6 Drawing Sheets

ADAPTIVELY READING ONE OR MORE BUT FEWER THAN ALL PIXELS OF IMAGE SENSOR

BACKGROUND OF THE INVENTION

An image sensor is a fundamental component of any device that measures or captures a spatial, frequency and/or intensity distribution of light to which it is exposed. An example of a system using such an image sensor is a digital camera system (irrespective of whether the system captures still or moving images).

The charge-coupled device (CCD) remains the most popular technology for implementing an image sensor. A competing technology is the CMOS image sensor.

It is known to provide structures on an image sensor to prevent pixels from blooming. A pixel is said to bloom when the level of electrons in the well rises above the point of being full (a.k.a. saturation) and electrons overflow/spread into adjacent pixels, which skews their accumulation of electrons.

In the case of a CCD image sensor, blooming prevention typically takes the form of providing an anti-blooming channel next to each vertical CCD (VCCD). If any of the pixels serviced by the VCCD blooms, then the overflowing electrons will spill into the anti-blooming channel and be drained away. It is further known to trigger reading of the entire CCD image sensor upon sensing the presence of electrons in any of the anti-blooming channels. This is known as electronic shuttering.

CMOS image sensors are inherently less prone to blooming because voltage is converted to charge at each pixel, and because it is not necessary to use shift registers (a VCCD and its horizontal counterpart, namely an HCCD) to bucket-brigade charge to the point of charge-to-voltage conversion. In addition, it is known to use the reset transistor present at each pixel as pixel-specific anti-blooming circuit.

Another difference between a CMOS and a CCD image sensor is that pixels on a CMOS sensor are individually addressable such that one or a few of the pixels can be read without having to read all of the pixels. This permits a CMOS image sensor to support windowing or window of interest (WOI) reading. Windowing is to be understood as reading a predetermined window (representing fewer than all of the pixels) from the image sensor without having to read all of the pixels. A user selects the window either by calculation or by reviewing a test image and then making the window selection. In contrast, CCD image sensors according to the Background Art have no provision for individually addressing one or more, but fewer than all, pixels, and so do not support windowing.

SUMMARY OF THE INVENTION

One of the embodiments of the invention is directed to a method of selectively reading less than all information from an image sensor for which member-pixels of a subset of the entire set of pixels are individually addressable. Such a method may include: sampling information from a targeted member-pixel of the subset without having to read information from the entire set of pixels; and selectively reading information from another one or more but fewer than all member pixels of the entire set based upon the sampling information without having to read all pixels on the image sensor.

Another one of the embodiments of the invention is directed to a method of selectively reading data from an image sensor. Such a method may include: reading less than all data from an image sensor for which selected ones but not all of the entire set of pixels are individually addressable.

Another one of the embodiments of the invention is directed to a digital camera. Such a camera may include: a pixel-differentiated image sensor for which member-pixels of a subset of the entire set of pixels are individually addressable, the image sensor being controllable to read less than all of the pixels without having to read all of the pixels; and a processor operable to obtain sampling information from a targeted member-pixel of the subset without having to read information from the entire set of pixels; and selectively obtain information from another one or more but fewer than all member pixels of the entire set based upon the sampling information without having to read all of the pixels on the image sensor.

Another one of the embodiments of the invention is directed to another digital camera. Such a camera may include: a pixel-differentiated image sensor for which selected ones of the entire set of pixels are individually addressable, the image sensor being organized into a matrix of partitions, each partition including a member-pixel of the subset referred to as a sampling pixel; and a processor operable to obtain sampling data from a sampling pixel without having to obtain information from the other pixels in the corresponding partition; and selectively obtain data from at least the entire corresponding partition but fewer than all of the partitions depending upon the sampled-data without having to obtain information from all of the pixels on the image sensor.

Additional features and advantages of the invention will be more fully apparent from the following detailed description of example embodiments and the accompanying drawings.

BRIEF DESCRIPTION OF THE DRAWINGS

The drawings are: intended to depict example embodiments of the invention and should not be interpreted to limit the scope thereof.

DETAILED DESCRIPTION OF THE EXAMPLE EMBODIMENTS

An embodiment of the invention, at least in part, is the recognition of the following as it relates to a CCD image sensor. While detecting the presence of electrons in an anti-blooming channel represents a type of sampling of a column of pixels, it is a coarse type of sample for which the identity of the blooming pixel (i.e., the row of the blooming pixel) is unknown. Moreover, because such a sample was originally intended to prevent the effect of blooming upon neighboring pixels, the sample is taken only when the blooming pixel has already reached saturation. It would be desirable to read a value for a pixel value more frequently than upon the pixel blooming, without also having to read all of the pixels of the image sensor.

An embodiment of the invention, at least in part, also is the recognition of the following. Windowing would be more desirable if it was not necessary to predetermine the area representing the window. For example, reading dynamic portions of an image without also having to read relatively static portions of an image (thereby reducing processing load) would be made much more efficient if the dynamic portions of the image could be adaptively recognized automatically by the image sensor and/or the processing circuitry operating upon the data being output by the image sensor.

Figure 1:
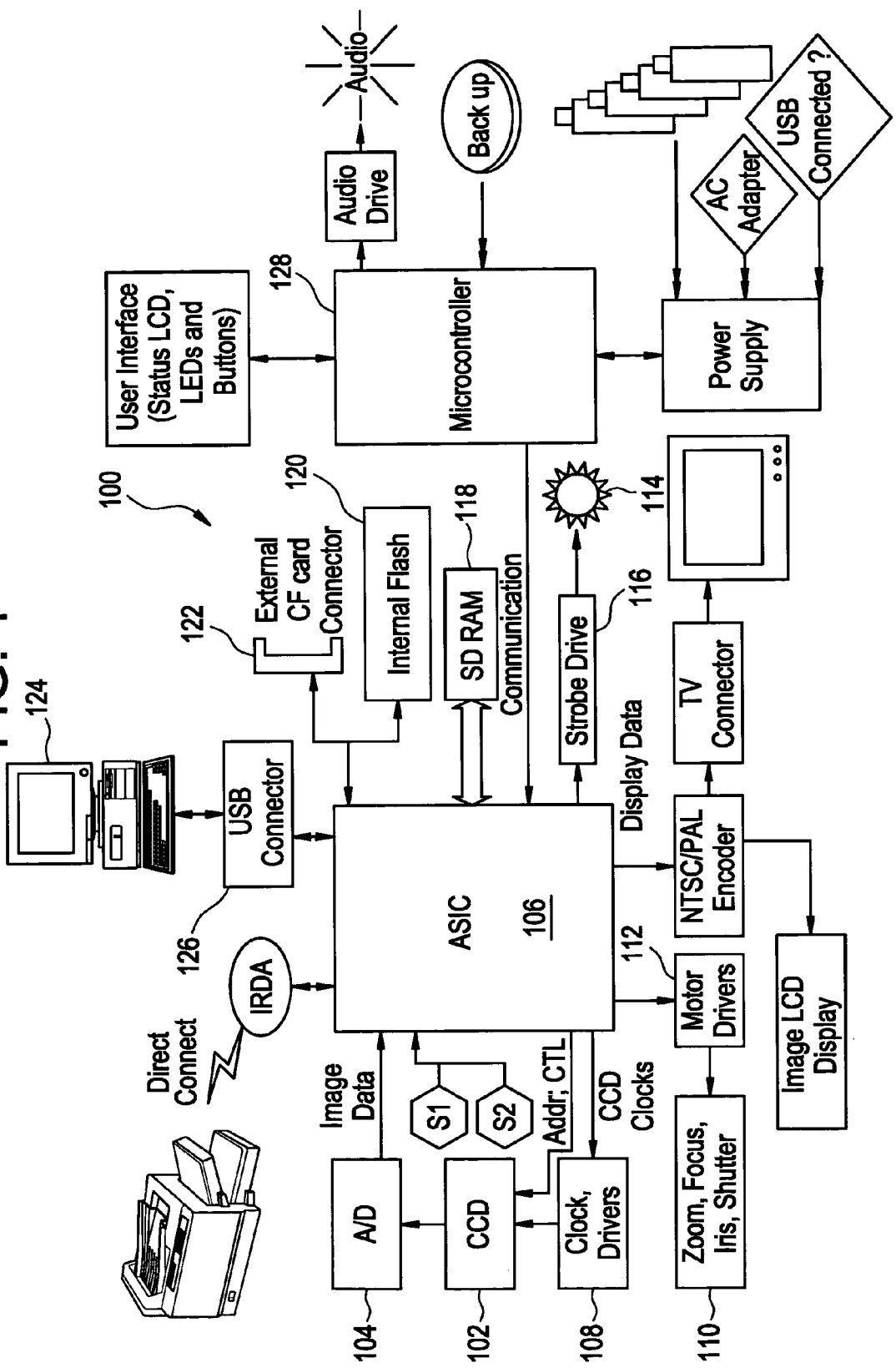
FIG. 1 is a block diagram of a digital camera architecture according to an embodiment of the invention.

FIG. 1 is a schematic block diagram of hardware architecture of a digital camera 100 according to an embodiment of the invention. The digital camera 100 of FIG. 1 includes an image sensor 102 having partition readability and selected pixel readability (all or fewer than all of the pixels being individually addressable), according to an embodiment of the invention (to be discussed below). The image sensor 102 alternatively can be described as a pixel-differentiated image sensor. Details of how to process fewer than all pixels from the image sensor 102, without having to read all the pixels, will be discussed below, e.g., in terms of FIGS. 4A-4B.

The image sensor 102 can be a charge-coupled-device ("CCD") (as it is labeled for convenience in FIG. 1), or a CMOS device, each of which can output an analog signal.

The analog signal from the image sensor 102 can be provided to an analog-to-digital ("A/D") device 104. Optionally, the A/D device 104 can be provided on the same integrated circuit as the image sensor 102. The A/D converter 104 provides a digitized version of the output of the image sensor 102 to an application-specific integrated circuit ("ASIC") 106 (a type of processor). The ASIC 106 provides clock signals to clock drivers 108 that are used to operate the image sensor 102.

The camera 100 also includes: zoom (optional), focus, iris and shutter mechanisms 110 that are operated via motor drivers 112 by the ASIC 106; and a flash unit 114 operated via a strobe drive 116 (e.g., of variable strobe duration) controlled by the ASIC 106. As for memory devices, the digital camera 100 includes: a volatile memory 118, e.g., a synchronous dynamic random access memory ("SDRAM") device; and a non-volatile memory 120, e.g., an internal flash memory device. Also, a connector 122 for connection to an external compact flash memory device is provided. The ASIC 106 can also connect to an external work station 124, e.g., through a universal serial bus ("USB") connector 126. The digital camera 100 also includes a microcontroller 128 with which the ASIC 106 can communicate.

Other architectures for the camera 100 are contemplated. Each such architecture can include one or more processors, one or more volatile memory devices and one or more non-volatile memory devices.

Figure 2:
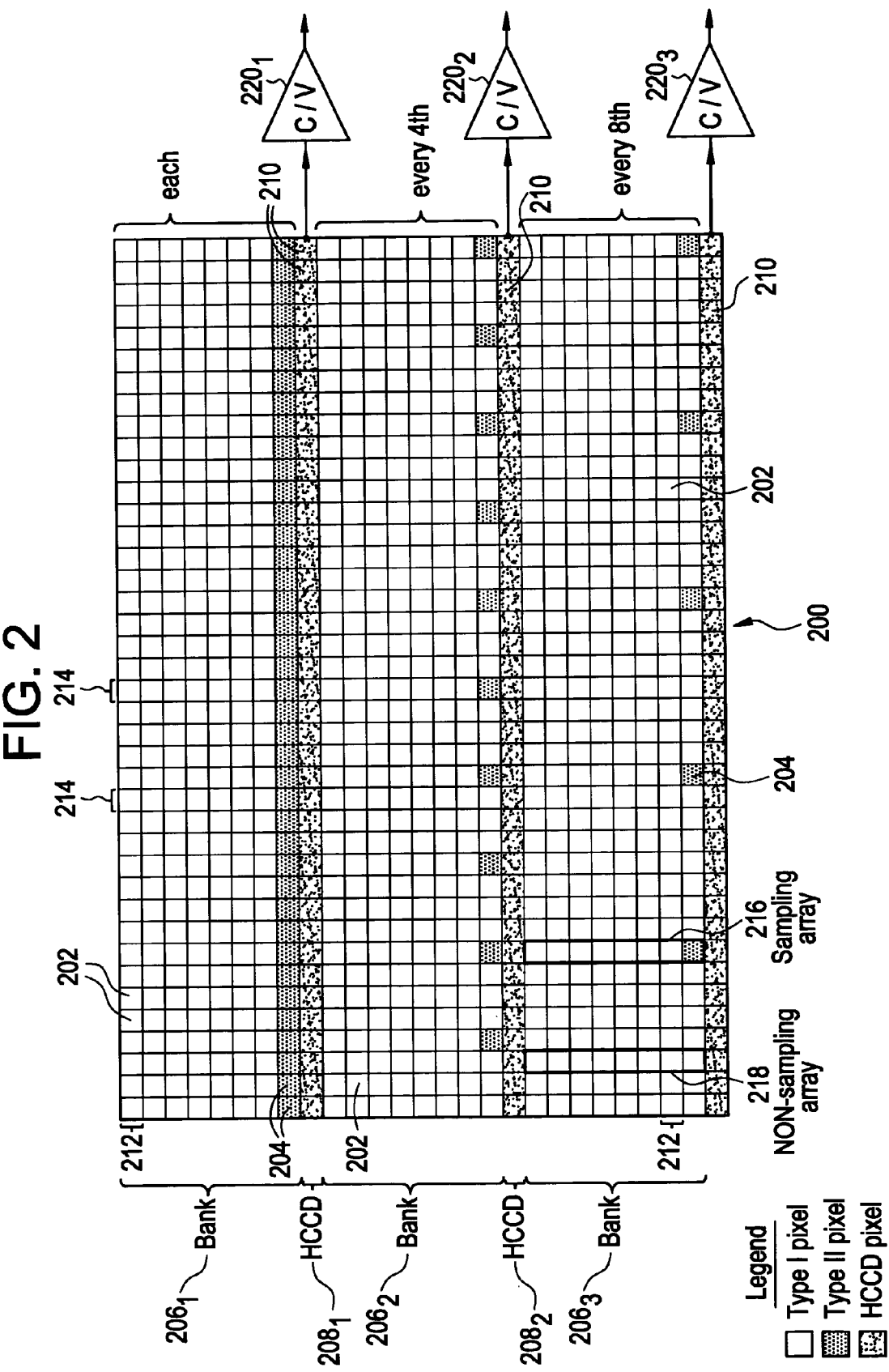
FIG. 2 is a more detailed depiction of an example of the pixel-differentiated CCD image sensor in FIG. 1.

FIG. 2 is a block diagram of a portion of an example of a pixel-differentiated CCD image sensor 200 corresponding to the image sensor 102. Details of various pixel-differentiated CCD image sensors can be found in a copending related application by the same inventors. U.S. patent application No. 10/648391, filed the same day as the present application and entitled "Pixel-Differentiated CCD Architecture"), the entirety of which is hereby incorporated by reference. Only a portion of the pixel-differentiated image sensor 200 is shown in order to simplify the depiction. There are further simplifications in FIG. 2, as will be discussed below.

The image sensor 200 includes a first plurality of photo-sensing pixels, the majority of which can be classified as a first type of photo-sensing pixel 202 (hereinafter also referred to as a Type I pixel). Here, the first plurality further includes pixels that can be classified as a second type of photo-sensing pixel. 204 (hereinafter also referred to as a Type II pixel). The Type I pixels 202 can be thought of as non-sampling pixels. In contrast, the Type II pixels can be thought of as sampling pixels. Physically, the Type I pixels 202 and the Type II pixels 204 are the same but for the addressing and control lines going to them, respectively, which give rise to their different classifications. More about the differences between Type I (non-sampling) and Type II (sampling) pixels will be discussed below. Alternatively, additional types of pixels can be provided on the image sensor 200.

In the CCD implementation, the first plurality of photo-sensing pixels is organized into banks $206_1$, $206_2$ and $206_3$. Each bank $206_i$ can be described as having rows 212 and columns 214. Each bank $206_i$ has a linear array $208_i$ ($208_1$, $208_2$ and $208_3$, respectively) of information-transferring cells 210 adjacent one of its sides, e.g., here its lower side. The array $208_i$ is typically referred to as a horizontal linear CCD (HCCD).

Charge that is produced in each of the pixels 202 and 204 is, e.g., in the CCD implementation, transferred by bucket-brigading vertically down each respective column 214 to the corresponding HCCD $208_i$ and moving transversely (e.g., here horizontally to the right) through HCCD $208_i$ to a corresponding known charge amplifier (a.k.a. charge-to-voltage converter) $220_i$ ($220_1$, $220_2$ and $220_3$, respectively).

Each bank $206_i$ is organized into arrays, each array being either a sampling array 216 or a non-sampling array 218. A sampling array 216 includes a Type II pixel 204 at the bottom, closest to the corresponding HCCD $208_i$. The other pixels in the array 216 are Type I pixels 202. The non-sampling array 218 includes Type I pixels 202 but does not include any Type II pixels 204.

An image sensor 200 can be formed with or without non-sampling arrays 218, but sampling arrays 216 will always be present. Where both are present, any number of ratios of sampling:non-sampling arrays can be used depending upon the circumstances for which the image sensor 202 is contemplated for use.

Returning to FIG. 2, it depicts the banks $206_1$, $206_2$ and $206_3$ in the image sensor 200 as each being of a different constant ratio of sampling:non-sampling arrays. This can be an example of a decreasing gradient in the density of sampling-arrays 218. One of ordinary skill would also understand that every bank $206_i$ in the image sensor 200 can have the sampling:non-sampling ratio of the bank $206_1$ (no non-sampling arrays 218), or the bank $206_2$ (namely, 25% sampling arrays 216) or the bank $206_3$ (namely, 12.5% sampling arrays 216) or some other ratio.

Similarly, for simplicity, FIG. 2 depicts each of the sampling array 216 and the non-sampling array 218 as having a total of 8 pixels. This is a convenient number that permits three banks $208_i$ to be depicted in a drawing, but any number of pixels can be selected for inclusion in an array 216/218. As before, the number of pixels in an array will depend upon the circumstances for which the image sensor 202 is contemplated for use. The number of pixels in an array 216/218 is not a limitation upon the invention.

Lastly, the overall size of the image sensor 200 has similarly been simplified in FIG. 2. In practice, the total number of photosensing pixels 202/204 in the image sensor 200 of FIG. 2 will depend upon the circumstances for which the image sensor 202 is contemplated for use.

In a sampling mode, the array 200 is controllable so that only the information in one or more of the Type II pixels 204 is sampled/read. The information in the Type I pixels 202 is not read in the sampling-mode. Depending upon the value of the one or more samples read from the Type II pixels 204, the array 200 is controllable in a read-mode (more detail to be discussed below) so that the information in one or more Type I pixels located within a predetermined area adjacent to or surrounding the one or more Type II pixels, respectively, is read without the need to read all of the Type I pixels. The term "controllable" is used here to connote that the image sensor 102, particularly the array 200, is configured with clocking lines and address/control lines so that the clocking circuit 108 and control logic, e.g., in the ASIC 106, respectively, can control the array 200 to behave according to the sampling-mode or the read-mode.

Figure 3:
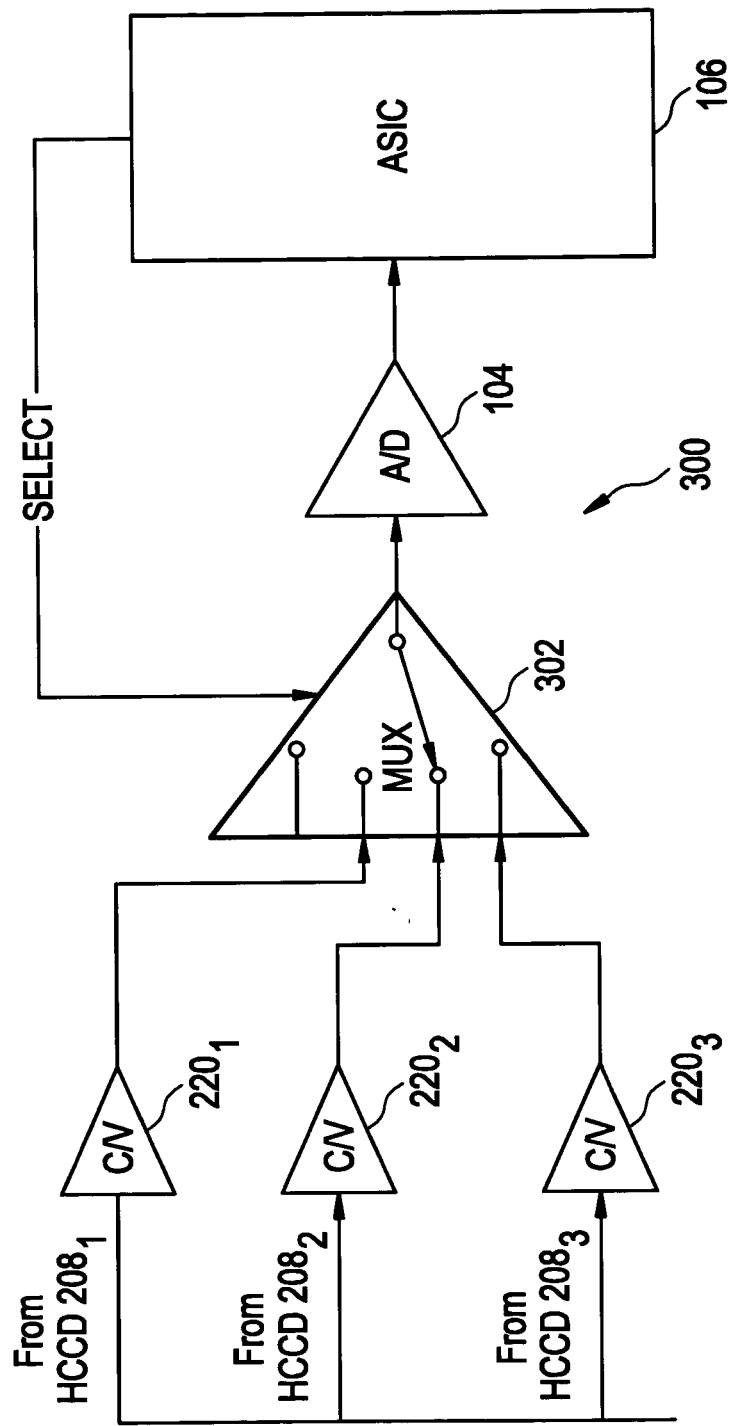
FIG. 3 is a block diagram of an example configuration for reading information from an image sensor according to an embodiment of the invention.

FIG. 3 is a block diagram, in the case that the image sensor 102 is a CCD, of an example configuration 300 for how information can be read from the image sensor 102 by the ASIC 106 according to an embodiment of the invention. The voltage outputs of the charge-to-voltage (C/V) converters $220_1$, $220_2$ and $220_3$ are provided to a multiplexer 302. The ASIC 106 can control which C/V converter $220i$ is selected. The output of the multiplexer 302 can be provided to the analog-to-digital (A/D) converter 104, whose digital output can be provided to the ASIC 106. In coordination with the clock drivers 108, the ASIC 106 can control the HCCDs $208_j$ to shift one cell to the right, the respective charge being converted to voltage by the C/V converters $220_j$. For each such batch of voltages, the ASIC 106 can control the multiplexer 302 to select voltage from each C/V converter $220_j$ which gets digitized by the A/D converter 304 and provided to the ASIC 106. One of ordinary skill will understand other ways to convert charge on the image sensor 200 into voltages representing pixel values upon which the ASIC 106 can operate.

Where the image sensor 102 is a CMOS image sensor, each of the pixels is individually addressable. Hence, how the ASIC 106 reads pixels values (be they from Type I or Type II pixels) from the image sensor 102 is like reading data from a memory device represented as a two-dimensional matrix.

Figure 4A:
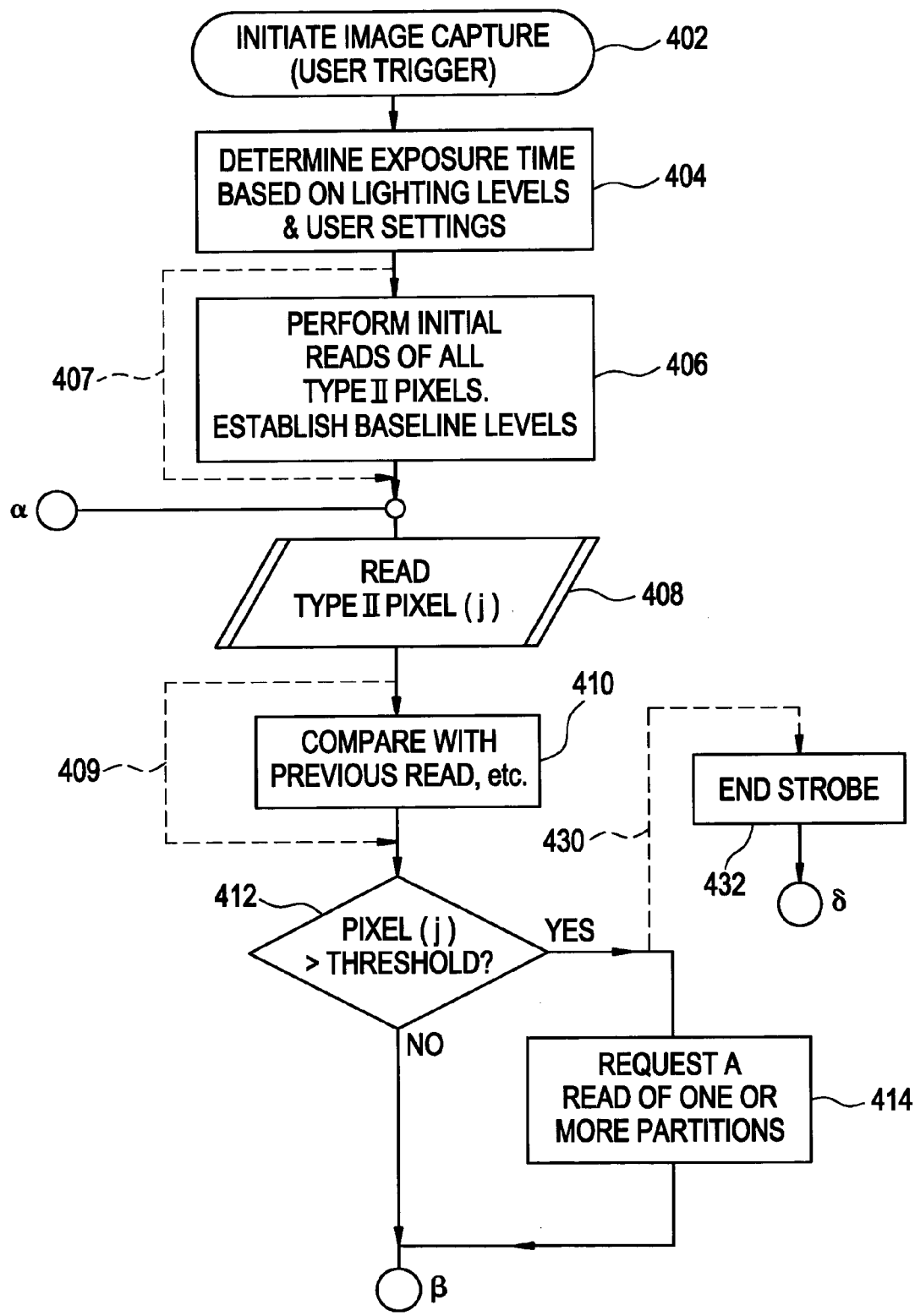
FIGS. 4A-4B depict a flowchart for selectively reading some but fewer than all pixels from an image sensor, without having to read all the pixels, according to an embodiment of the invention.
Figure 4B:
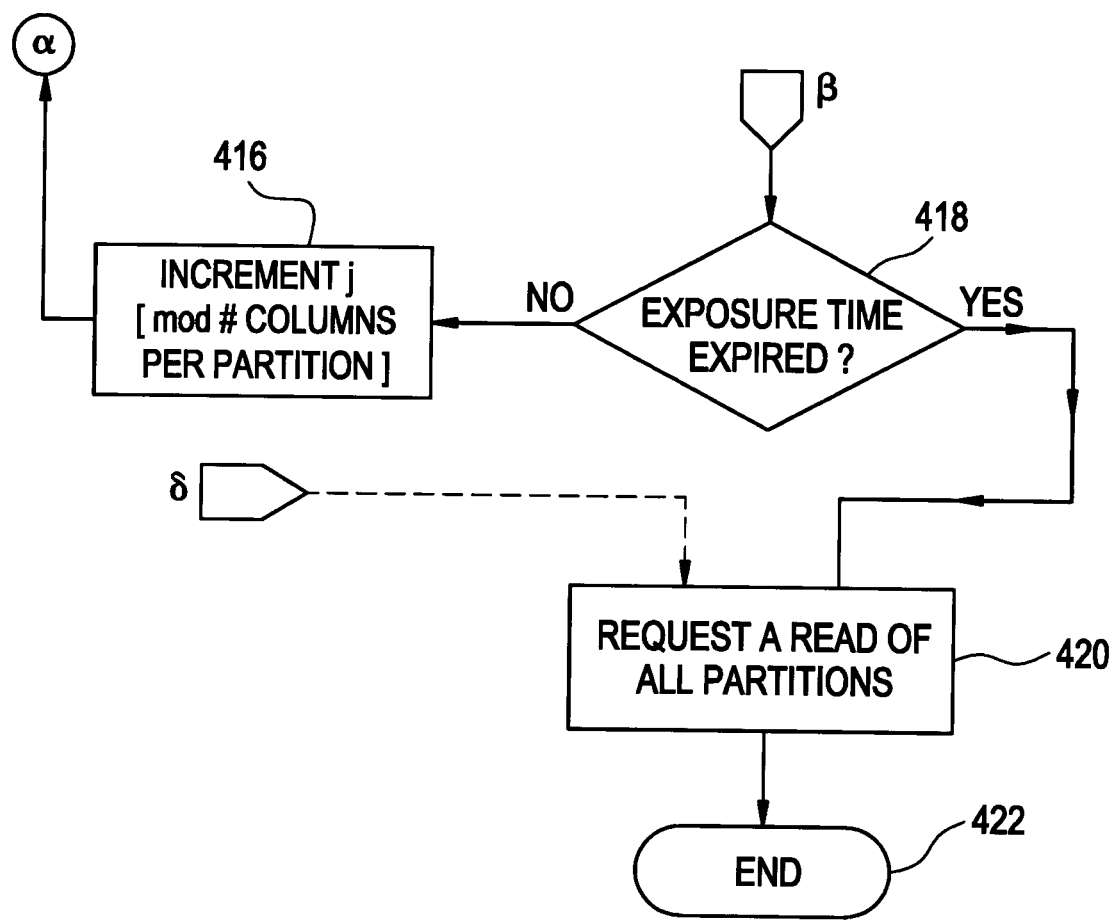

FIGS. 4A-4B depict a flowchart for selectively reading, e.g., by the ASIC 106, in a sample mode some but fewer than all pixels from an image sensor, e.g., 200, without having to read all the pixels, according to an embodiment of the invention. Flow begins in FIG. 4A at block 402, where the ASIC 106 initiates the capture of an image, e.g., in response to a user's trigger, which could be the user depressing a shutter button on the camera 100. Flow proceeds to block 404, where the ASIC 404 can determine exposure time based upon, e.g., lighting levels and/or user settings, etc.

Flow can proceed directly via arrow 407 from block 404 to block 408, where a loop is entered in which the ASIC 106 iteratively reads one or more, e.g., all of, the Type II pixels 204 to obtain one or more corresponding samples, respectively, without also having to read the Type I pixels. In the case of the image sensor 102 being a CCD, again, details of how Type II pixels 204 can be read without also having to read the Type I pixels 202 are found in the related copending application, mentioned above. Regardless of whether the image sensor 102 is a CCD or a CMOS device, the ASIC 106 is configured to handle the samples in a manner that preserves a relationship between (1) each sample and (2) the location (on the image sensor 102) and/or the identity of the Type II pixel 204 from which the sample was generated.

Flow can proceed directly via arrow 409 to decision block 412, where the ASIC 106 determines if the value of the current ($j^{th}$) pixel exceeds a reference (also known as a threshold) value. If not, then flow can proceed to decision block 418 (see FIG. 4B). But if the value of the current ($j^{th}$) pixel exceeds the reference value, then flow proceeds to block 414, where the ASIC requests (or queues) (to be discussed further below; see FIG. 5) the reading of one or more partitions corresponding to the $j^{th}$ Type II pixel 204. Flow proceeds from block 414 also to decision block 418.

At the decision block 418 in FIG. 4B, the ASIC 106 determines if a maximum exposure time has expired, e.g., if a timer value exceeds a predetermined value representing an exposure time such as might be set manually by a user or via a program mode of the ASIC 106. If not, then flow proceeds to block 416. But if the exposure time has expired, then flow proceeds to block 420, where the ASIC 106 reads all partitions from the image sensor 102. From block 420, flow ends at block 422.

In the case where flow proceeds to block 416 of FIG. 4B, there the ASIC 106 increments the value of the loop counter, j, in preparation for operating upon the value representing the next Type II pixel 204. For example, assume a situation in which a Type II pixel is found in each partition, and each partition has k columns of pixels, so each Type II pixel is located k pixels apart, hence the value of j can be incremented by k, i.e., modulo k. Flow proceeds from block 416 back up to block 408.

It should be understood that the ASIC 106 can read a sample, and check the sample against the reference value, then optionally request/queue a partition-read before getting the next sample. Or, the ASIC 106 can read all the values of the Type II pixels into a buffer and then iteratively compare each pixel's value to a global reference value or to individualized reference values, respectively).

While flow can proceed directly via arrow 407 from block 404 to block 408, this is optional (as indicated by the arrow 407 being depicted in phantom lines). According to an alternative embodiment of the invention (hereafter referred to as the recursive embodiment), flow can proceed from block 404 directly to block 406, where the ASIC 106 causes all of the value of the Type II pixels to be read in order to obtain initial values, respectively.

Similarly, while flow can directly via arrow 409 from block 408 to block 412, this is optional (as indicated by the arrow 409 being depicted in phantom lines). According to the recursive embodiment, flow can proceed from block 408 directly to block 410, where the ASIC 106 compares the current value of the $j^{th}$ TYPE II pixel 204 to the previous value of the $j^{th}$ pixel (which in the first comparison corresponds to the initial value obtained at block 406). An example of such a comparison can be taking the difference between the current value and the previous value. The difference can then be compared against the reference value in the subsequent decision block 412, where the reference value in the recursive embodiment can represent an a moderate or insignificant amount of change indicative of an image that is not particularly dynamic. Continuing the example, if the output of the decision block 412 is "YES", then this indicates that the portion of the image represented by the $j^{th}$ TYPE II pixel 204 is dynamic.

Figure 5:
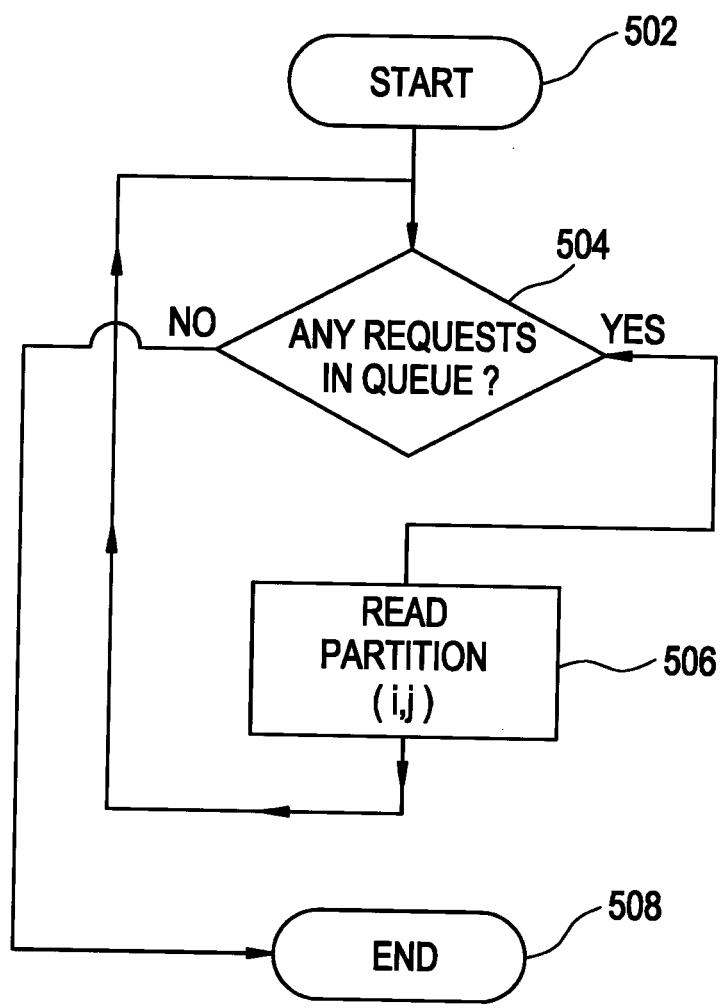
FIG. 5 depicts a flowchart for handling a queue of partition-read requests according to an embodiment of the invention.

FIG. 5 depicts a flowchart for handling the queue of partition-read requests in the read-mode built up by block 420 of FIG. 4B, according to an embodiment of the invention. Flow in FIG. 5 begins at block 502 (once flow ends at block 422 in FIG. 4B) and proceeds to decision block 504. At decision block 504, the ASIC 106 determines if there are any partition-read requests in the queue. If not, flow proceeds to block 508 and ends. But if there is at least one partition-read request in the queue, then flow proceeds from decision block 504 to block 506. At block 506, the ASIC 106 reads the partitions corresponding to the read-requests in the queue. Again, fewer than all partitions from an image sensor 102 can be read at block 506 without having to read all the partitions.

Again, a partition-read request can be for the sampling array 216 of which the corresponding Type II pixel 204 is a part (the instant sampling array), or the instant sampling array 216 plus one or more of the non-sampling arrays 218 in the horizontal direction between the instant sampling array 216 and adjacent sampling arrays 216. Similarly, in addition to or as an alternative, arrays above and below the instant sampling array 216 can be read as part of the partition-read request.

Where an image has portions that are dynamic and portions that are relatively static by comparison, e.g., a car speeding past an intersection, and the corresponding dynamic partitions are read many times as compared to the relatively static portions being read once, the ASIC 106 can process the extra partition-read requests in order to create a series of images corresponding in time to the more frequently read partitions.

An application to which such adaptive reading (of one or more but fewer than all pixels of image sensor without having to read all pixels) can be put is adaptive control of the duration of a flash strobe. Upon determining that a Type II pixel has been, e.g., saturated, at block 412 of FIG. 4A, flow can optionally proceed to block 432 (as indicated by arrow 430 being depicted in phantom lines) rather than to block 414. At block 432, the ASIC 106 can control the strobe drive 116 to terminate strobing of the flash unit 114. Flow can then proceed to block 420 of FIG. 4B where all the partitions are read.

The invention being thus described, it will be obvious that the same may be varied in many ways. Such variations are not to be regarded as a departure from the spirit and scope of the invention, and all such modifications are intended to be included within the scope of the present invention.

We claim:

1. A method of selectively reading less than all information available at an output of an image sensor for which member-pixels of a subset of an entire set of pixels are individually addressable, the method comprising:
    sampling information, at the output of the image sensor, representing a targeted member-pixel of the subset without having to read information representing the entire set of pixels;
    selectively reading information, at the output of the image sensor, representing at least one or more, but fewer than all member pixels, of the entire set based upon the sampling information without having to read information representing all pixels on the image sensor, wherein each pixel can be individually read, independently of other pixels;
    accessing a first set of sampling photo-sensing pixels of the image sensor and accessing a second set of non-sampling pixels of the image sensor, wherein the first and the second set of pixels have different physical circuitry addressing and control lines going to them, respectively;
    organizing the entire set of pixels into dynamic and static partitions, each respective partition having multiple pixels;
    mapping one or more of the dynamic and the static partitions to one or more of the member-pixels of the subset, respectively; and
    reading the static partitions once and the dynamic partitions multiple times and processing extra partition-read requests for creating a series of images corresponding in time to more frequently read partitions.

2. The method of claim 1, further comprising:
    reading information, at the output of the image sensor, representing member- pixels of the entire set that are located within a predetermined area adjacent to or surrounding the targeted member-pixel of the subset.

3. The method of claim 2, further comprising:
    reading information, at the output of the image sensor, representing all member- pixels of the subset so as to generate a plurality of samples;
    handling the samples in a manner that preserves a relationship between each sample and corresponding member-pixel of the subset; and
    reading information, at the output of the image sensor, representing one or more of the partitions mapped to the member-pixels of the subset but not all of the partitions based upon the plurality of samples.

4. The method of claim 1, further comprising:
    determining if the sampling information exceeds a reference value; and
    reading information, at the output of the image sensor, representing the one or more but fewer than all member-pixels of the entire set if the sampling information exceeds the reference value.

5. The method of claim 4, wherein the reference value represents one of a user-determined threshold or a saturation threshold for the targeted member-pixel of the subset.

6. The method of claim 4, further comprising:
    reading information, at the output of the image sensor, representing all member- pixels of the subset so as to generate a plurality of samples, each member-pixel of the subset having a corresponding reference value, respectively;
    applying the determining step to each of the samples; and
    reading information, at the output of the image sensor, representing the one or more but fewer than all member-pixels of the entire set located within a predetermined area adjacent to or surrounding member-pixels for which the corresponding sample exceeds the respective reference value.

7. The method of claim 4, wherein:
    the sampling information is the current sampling information and the reference value is a first reference value; and
    the method further comprises:
        taking the difference between the current sampling information and the first reference value; and
        reading, at the output of the image sensor, information representing the one or more but fewer than all member-pixels of the entire set if the difference exceeds a second reference value.

8. The method of claim 7, wherein the first reference value is the previous sampling information.

9. The method of claim 7, further comprising:
    setting the first reference value to be equal to the current sampling information if the difference exceeds the second reference value.

10. The method of claim 1, further comprising:
    measuring an elapsed time; and
    reading information, at the output of the image sensor, representing all member-pixels of the subset if the elapsed time exceeds a predetermined amount.

11. The method of claim 10, further comprising:
    measuring another instance of elapsed time upon reading information, at the output of the image sensor, representing all member-pixels of the subset.

12. The method of claim 1, wherein the image sensor is one of a CCD image sensor for which the subset is smaller than the entire set and a CMOS image sensor for which the subset is the same as the entire set.

13. A method of selectively reading data available at an output of an image sensor, the method comprising:

reading less than all data available at the output of the image sensor for which selected ones but not all of the entire set of pixels are individually addressable, wherein each pixel can be individually read, independently of other pixels;

accessing a first set of sampling photo-sensing pixels of the image sensor and accessing a second set of non-sampling pixels of the image sensor, wherein the first and the second set of pixels have different physical circuitry addressing and control lines going to them, respectively;

organizing the entire set of pixels into dynamic and static partitions, each respective partition having multiple pixels;

mapping one or more of the dynamic and the static partitions one or more of the member-pixels of the subset, respectively; and reading the static partitions once and the dynamic partitions multiple times and processing extra partition-read requests for creating a series of images corresponding in time to more frequently read partitions.

14. The method of claim 13, further comprising:
organizing the image sensor into a matrix of partitions, each partition including a member-pixel of the subset referred to as a sampling pixel;
sampling data, at the output of the image sensor, representing a sampling pixel without having to read information representing the other pixels in the corresponding partition; and
selectively reading data, at the output of the image sensor, representing at least the entire corresponding partition but fewer than all of the partitions depending upon the sampled-data without having to read all of the pixels on the image sensor.

15. The method of claim 14, further comprising:
reading data, at the output of the image sensor, representing partitions located within a predetermined area adjacent to or surrounding the sampling pixel.

16. The method of claim 14, further comprising:
determining if the sampled-data exceeds a reference value; and
reading data, at the output of the image sensor, representing the one or more but fewer than all member-pixels of the entire set if the sampled-data exceeds the reference value.

17. The method of claim 16, wherein the reference value represents a saturation threshold for the targeted member-pixel of the subset.

18. The method of claim 16, wherein:
the sampled data is the currently sampled data and the reference value is a first reference value; and
the method further comprises
taking the difference between the currently sampled data and the first reference value, and
reading, at the output of the image sensor, information representing the one or more but fewer than all member-pixels of the entire set if the difference exceeds a second reference value.

19. The method of claim 18, wherein the first reference value is the previously sampled data.

20. The method of claim 18, further comprising:
setting the first reference value to be equal to the currently sampled data if the difference exceeds the second reference value.

21. The method of claim 14, further comprising:
measuring an elapsed time; and
reading data, at the output of the image sensor, representing all member-pixels of the entire set of pixels if the elapsed time exceeds a predetermined amount.

22. The method of claim 21, further comprising:
measuring another instance of elapsed time upon reading information, at the output of the image sensor, representing the entire set of pixels.

23. The method of claim 14, wherein the image sensor is one of a CCD image sensor for which the subset is smaller than the entire set and a CMOS image sensor for which the subset is the same as the entire set.

24. A digital camera comprising:
a pixel-differentiated image sensor for which member-pixels of a subset of the entire set of pixels are individually addressable, the image sensor being controllable to read less than all of the pixels without having to read all of the pixels;
a processor operable to
obtain sampling information from a targeted member-pixel of the subset without having to read information from the entire set of pixels; and
selectively obtain information from another one or more but fewer than all member pixels of the entire set based upon the sampling information without having to read all of the pixels on the image sensor, wherein each pixel can be individually read, independently of other pixels;
organize the entire set of pixels into dynamic and static partitions, each respective partition having multiple pixels;
map one or more of the dynamic and the static partitions one or more of the member-pixels of the subset, respectively; and
read the static partitions once and the dynamic partitions multiple times and process extra partition-read requests for creating a series of images corresponding in time to more frequently read partitions;
a first set of sampling photo-sensing pixels of the image sensor; and
a second set of non-sampling pixels of the image sensor;
wherein the first and the second set of pixels have different physical circuitry addressing and control lines going to them, respectively.

25. The digital camera of claim 24, wherein the processor is operable to selectively obtain information from member-pixels of the entire set that are located within a predetermined area adjacent to or surrounding the targeted member-pixel of the subset.

26. The digital camera of claim 25, wherein
the processor is operable to read information from all member-pixels of the subset so as to generate a plurality of samples;
the processor further being operable to
handle the samples in a manner that preserves a relationship between each sample and corresponding member-pixel of the subset, and
read information from one or more of the partitions mapped to the member-pixels of the subset but not all of the partitions based upon the plurality of samples.

27. A digital camera comprising:
a pixel-differentiated image sensor for which selected ones of the entire set of pixels are individually addressable, the image sensor being organized into a matrix of partitions, each partition including a member-pixel of the subset referred to as a sampling pixel; and
a processor operable to obtain sampling data from a sampling pixel without having to obtain information from the other pixels in the corresponding partition, and selectively obtain data from at least the entire corresponding partition but fewer than all of the partitions depending upon the sampled-data without having to obtain information from all of the pixels on the image sensor, wherein each pixel can be individually read, independently of other pixels;

access a first set of sampling photo-sensing pixels of the image sensor and access a second set of non-sampling pixels of the image sensor, wherein the first and the second set of pixels have different physical circuitry addressing and control lines going to them, respectively; and organize the entire set of pixels into dynamic and static partitions, each respective partition having multiple pixels;

map one or more of the dynamic and the static partitions one or more of the member-pixels of the subset, respectively; and read the static partitions once and the dynamic partitions multiple times and process extra partition-read requests for creating a series of images corresponding in time to more frequently read partitions.

28. The digital camera of claim 27, wherein the processor is operable to selectively obtain data from partitions located within a predetermined area adjacent to or surrounding the sampling pixel.

* * * * *

UNITED STATES PATENT AND TRADEMARK OFFICE
CERTIFICATE OF CORRECTION

| | | |
|---|---|---|
| PATENT NO. | : 8,462,244 B2 | Page 1 of 1 |
| APPLICATION NO. | : 10/648445 | |
| DATED | : June 11, 2013 | |
| INVENTOR(S) | : Heather N Bean et al. | |

It is certified that error appears in the above-identified patent and that said Letters Patent is hereby corrected as shown below:

In the Claims

In column 7, line 67, in Claim 2, delete "member- pixels" and insert -- member-pixels --, therefor.

In column 8, line 5, in Claim 3, delete "member- pixels" and insert -- member-pixels --, therefor.

In column 8, line 26, in Claim 6, delete "member- pixels" and insert -- member-pixels --, therefor.

Signed and Sealed this
Twenty-fourth Day of September, 2013

Teresa Stanek Rea
*Deputy Director of the United States Patent and Trademark Office*